United States Patent [19]
Martin

[11] 3,765,518
[45] Oct. 16, 1973

[54] WHEEL CYLINDER AND BLEEDING MEANS

[75] Inventor: Michael E. Martin, Creve Coeur, Mo.

[73] Assignee: Wagner Electric Corporation, Newark, N.J.

[22] Filed: Feb. 28, 1972

[21] Appl. No.: 229,881

[52] U.S. Cl.............. 188/352, 60/54.6 M, 92/75, 188/364
[51] Int. Cl............................................. F16d 65/00
[58] Field of Search.............. 188/352, 361, 362, 188/363, 364, 365, 368, 369, 370; 92/245, 50, 69, 75; 60/54.6 M

[56] References Cited
UNITED STATES PATENTS

| | | |
|---|---|---|
| 2,329,095 | 9/1943 | White .............................. 188/364 |
| 2,808,132 | 10/1957 | Faulkingham ...................... 188/363 |
| 2,752,755 | 7/1956 | Goepfrich ........................ 60/54.6 M |
| 2,979,906 | 4/1961 | Lindstrom.............................. 92/75 |
| 2,992,535 | 7/1961 | Barragan........................ 188/352 X |

Primary Examiner—George E. A. Halvosa
Attorney—Joseph E. Papin

[57] ABSTRACT

An abutment member is provided within the bore of a wheel cylinder for engagement with the wheel cylinder cups to prevent the movement thereof into blocking or overlapping engagement with the port hole opening in said bore upon vacuum bleeding of the brake system.

27 Claims, 13 Drawing Figures

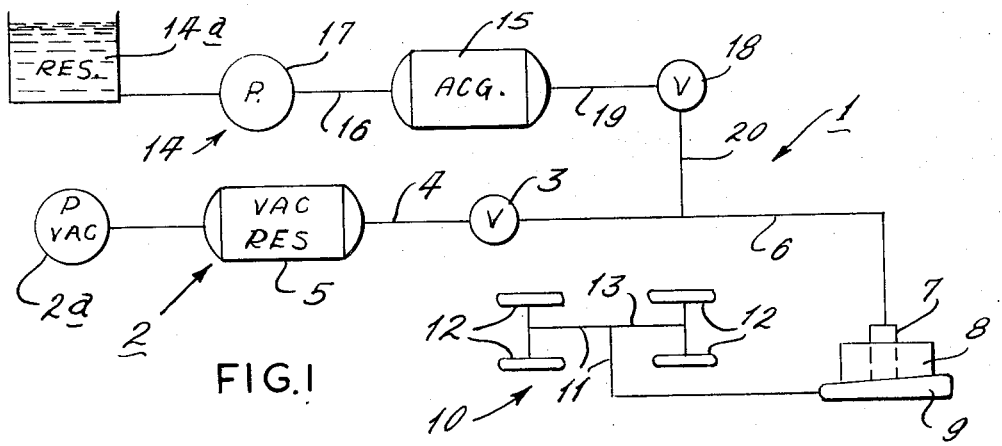
FIG.1
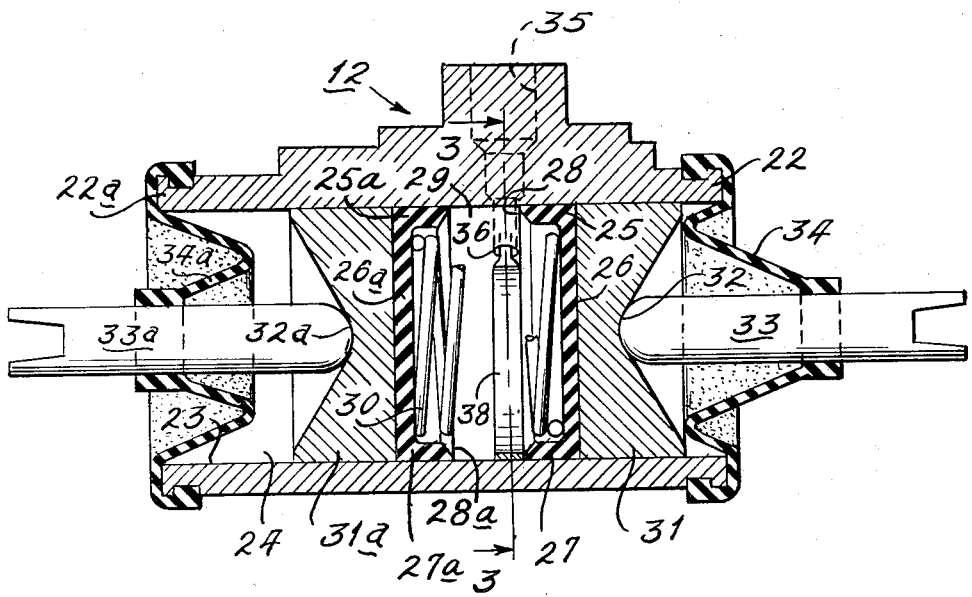
FIG.2
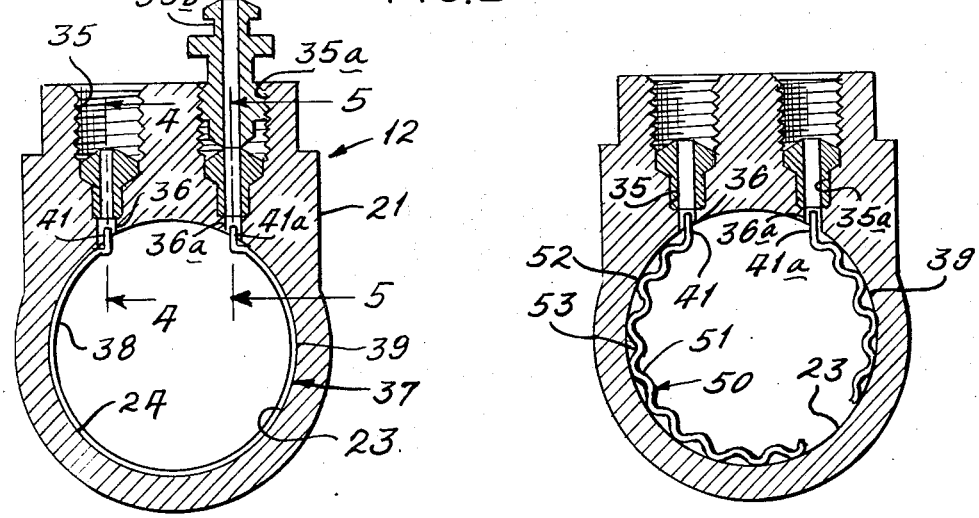
FIG.3
FIG.6

WHEEL CYLINDER AND BLEEDING MEANS

This invention relates generally to wheel cylinders and in particular to a member for use therein to prevent port hole blockage.

BACKGROUND OF THE INVENTION

In the past, wheel cylinders employed on brakes of a vehicle hydraulic brake system were each manually bled on the production lines of original equipment manufacturers in order to purge said brake system of any air which might be trapped therein. In order to reduce the time and labor involved in the aforementioned manual brake system bleeding operations, some original equipment manufacturers have converted their vehicle production lines to vacuum bleeding and filling of the brake system wherein a vacuum is initially created or drawn in said brake system after which brake fluid is immediately introduced thereinto to fill the void created by the vacuum. In this manner, the brake system was completely filled with brake fluid obviating the necessity of manually bleeding the brake system wheel cylinders; however, one of the disadvantageous or undesirable features encountered was that the sealing cups of said wheel cylinders were movable in response to the created vacuum acting thereon toward positions in the wheel cylinder bores in blocking or overlapping engagement with the bore port hole opening thereby disrupting the vacuum bleeding process.

Several constructions have been contemplated or utilized in the past in an effort to overcome the problem of wheel cylinder port hole blockage by the wheel cylinder cups in response to vacuum bleeding, but none has been effective for various reasons, as set forth hereinbelow. For instance, one of the past constructions provided an annular shoulder integrally formed with the wheel cylinder and extending radially into the wheel cylinder bore for abutment with the wheel cylinder cups to prevent blocking engagement thereof with the port hole opening which extended through said shoulder to communicate with said bore; however, while such construction did prevent port hole blockage by the cups upon vacuum bleeding, several undesirable features involved in such construction obviated the use thereof. Once of these undesirable features was that an entirely new wheel cylinder was needed to replace the present wheel cylinder on each brack design. Another of these undesirable features was that the burnishing and finishing opeations on the wheel cylinder bore were doubled since the shoulder in the wheel cylinder bore necessitated a burnishing and finishing operation through each end of the bore. Another undesirable factor was that the length of the wheel cylinder was necessarily increased in order to provide tool run-out for the burnishing and finishing tools which was occasioned by the provision of the shoulder within the wheel cylinder bore. And another undesirable factor was that enough turbulence could not be created in the ingressing flow of brake fluid during the vacuum bleeding process to effectuate "smooth" or complete bleeding of the system when the aforementioned integral shoulder was provided in the wheel cylinder bore for cup abutment purposes.

Another construction contemplated or utilized in the past to overcome the problem of wheel cylinder port hole blockage by the wheel cylinder cups in response to vacuum bleeding was the provision of a wheel cylinder spring between said cups having a predetermined stacked height. When the wheel cylinder cups were actuated toward each other in response to the created vacuum, the wheel cylinder spring was compressed therebetween, and the stacked height of said wheel cylinder spring was predetermined so that neither wheel cylinder cup could block the port hole upon the concerted movement of said wheel cylinder cups between opposed extreme positions in the wheel cylinder bore. One of the undesirable features of the spring predetermined stacked height construction was that it was functionally related to wheel cylinder bore length and manifestly dictated a longer bore than was desirable from a design point of view. For instance, in the modern day brake package, the design emphasis is placed on attaining greater effective braking surface within a given brake drum, and this is accomplished by increasing the arc of the brake shoe and lining within said drum; therefore, when the shoe and lining arc is increased, the length of the wheel cylinder manifestly must be decreased. Another undesirable feature of the spring predetermined stacked height construction was that if the spring stacked height was great enough to prevent port hole blockage by the wheel cylinder cups in the relatively short length bore of the modern wheel cylinder, the wheel cylinder cups and springs in their stacked positions, in effect, "caged" the opposing wheel cylinder pistons and brake shoes on the brake. In other words, when so "caged", a tolerance build up, i.e. either on the plus or minus side of the designed "size" of the brake shoes, wheel cylinder cups, pistons and springs, and the connecting links and the anchoring mechanisms of the brake, could effect either excessive or restrictive movement of the wheel cylinder cups, pistons and spring in the wheel cylinder bore. If the movement was excessive due to a tolerance build up on the minus side of "size", the wheel cylinder cups would, of course, block the port hole opening in the wheel cylinder bore obviating proper brake energization, and if the movement was restricted due to a tolerance build up on the plus side of "size," the brake could not be compressed enough to be received within its cooperating drum.

Another construction contemplated or utilized in the past to overcome the problem of wheel cylinder port hole blockage by the wheel cylinder cups in response to vacuum bleeding was the provision of a plug or filler within the wheel cylinder bore between the cups thereof to prevent the movement of said cups in response to the created vacuum into blocking position with the port hole; however, the plug or filler construction had the same undesirable features as the spring stacked height construction, as discussed hereinabove.

In addition to the foregoing, it should be noted that a construction for use in a wheel cylinder to prevent port hole blockage by the cups thereof in response to vacuum bleeding is indigenous to the original equipment manufacturer and his vacuum bleeding or filling process; however, in the replacement or aftermarket, such constructions are superfluous since the repair shops or garages employ the conventional pressure type bleeding process wherein the master cylinder is pressurized to purge the air trapped in the brake system through the wheel cylinder bleeder port.

SUMMARY OF THE INVENTION

The principle object of the present invention is to provide a wheel cylinder having port hole blockage preventing means for use therein and a system for vacuum bleeding and brake fluid filling of said wheel cylinder which overcomes the aforementioned undesirable or disadvantageous features of the aforementioned past constructions, and this, as well as other objects and advantageous features of the present invention will become apparent from the disclosure which follows.

Briefly, the present invention includes a wheel cylinder having a housing with a bore therein, a fluid pressure port in said housing intersecting with said bore and defining an opening therein, sealing means for said bore and reciprocally movable therein, and other means removably secured within said bore adjacent to said opening including means for spacing said sealing means from blocking engagement with said opening upon the movement of said sealing means in said bore in response to vacuum bleeding of said wheel cylinder. The invention also includes a system having vacuum bleeding and brake fluid filling means selectively operable to respectively create a vacuum in a vehicle brake circuit in which the aforementioned wheel cylinder is connected and inject brake fluid into said brake system and wheel cylinder to fill the void created therein by said vacuum.

BRIEF DESCRIPTION OF THE DRAWINGS

In the drawings which illustrate embodiments of the present invention and wherein like numerals refer to like parts wherever they occur:

FIG. 1 is a schematic diagram of a vacuum bleeding and brake fluid filling system for a vehicle hydraulic brake circuit embodied in the present invention;

FIGS. 2 and 11 are sectional views showing wheel cylinders for the vehicle brake circuit of FIG. 1 also embodied in the present invention in cross-section, respectively;

FIG. 3 is a sectional view taken along line 3—3 of FIG. 2;

FIGS. 6, 7 and 8 are sectional views taken along line 4—4 of FIG. 3 showing therein alternative constructions of spacing members also embodied in the present invention;

DETAILED DESCRIPTION OF THE INVENTION

Figure 4:
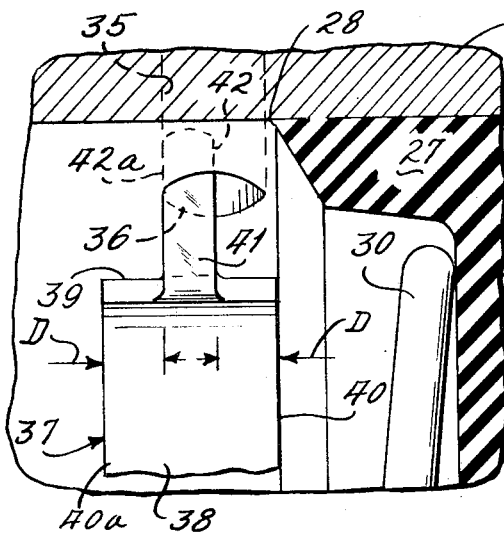
FIG. 4 is an enlarged partial sectional view taken along line 4—4 of FIG. 3.

Referring now to FIG. 1, a vacuum bleeding and brake fluid filling system, indicated generally at 1 and well known in the art, is provided with a vacuum producing branch 2 having a vacuum producing means, such as the vacuum pump 2a or the like, which is connected to a selectively operable valve 3 by a conduit 4 having a vacuum reservoir 5 interposed therein, and another flexible conduit 6 has one end connected with the valve 3 while the other end thereof connects with a probe or quick connecting fitting 7 which is insertable through the reservoir or supply tank portion 8 of vehicle master cylinder 9 into covering or sealing engagement about the compensating and supply port holes therein (not shown), as well known in the art. A conventional vehicle brake system or circuit, indicated generally at 10, is shown including the master cylinder 9 having conduit means 11 connected between the outlet port of said master cylinder and wheel cylinders 12 of the vehicle front brake assemblies (not shown), and branch conduit means 13 is connected between conduit means 11 and other wheel cylinders 12 of the vehicle rear brake assemblies (not shown), said brake assemblies being well known in the art. The system 1 is also provided with brake fluid pressurizing or injecting or filling means or branch 14 including brake fluid reservoir or source 14a which is connected to an accumulator 15 by a conduit 16 having a pump 17 interposed therein, and to complete said system, another selectively operable valve 18 has one side thereof connected with the accumulator by a conduit 19 while the other side thereof is connected by a conduit 20 with the conduit 6 between the valve 3 and probe fitting 7, as well known in the art.

Referring now to FIGS. 2 and 3, the vehicle brake circuit wheel cylinders 12, of which only one is shown and described hereinafter for the sake of simplicity, are provided with a housing 21 having opposed end portions 22, 22a, and an axial bore 23 having a cylindrical sidewall portion 24 is axially provided through said housing intersecting with said opposed end portions thereof. Opposed sealing means, such as wheel cylinders cups 25, 25a for instance, are provided with disc shaped base portions 26, 26a slidably or reciprocally received in the bore 23, and anular lip portions 27, 27a are integrally formed with said base portions and sealably engaged with the bore sidewall 24, said lips having annular interior ends or abutments 28, 28a axially spaced from said base portions. The cups 25, 25a define with the bore sidewall 24 an expansible chamber 29, and a return spring 30 of negligible force is biased between said cups in said chamber urging the cup base portions 26, 26a toward following or abutting engagement with opposed pistons 31, 31a which are slidably received in the bore 23. Opposed recesses or sockets 32, 32a are provided in the exterior portions of the pistons 31, 31a, and connecting or thrust links 33, 33a are drivingly connected between said piston recesses and the opposed brake shoes of the vehicle brake (not shown) on which the wheel cylinder 12 is mounted. Resilient boots 34, 34a are connected in sealing engagement between the housing 21 adjacent to the opposed ends 22, 22a thereof and the connecting links 33, 33a to prevent the entry of foreign particles into the bore 23. Inlet and bleeder ports or passages 35, 35a are provided in the housing 21 intersecting with the bore 23 and defining openings 36, 36a in the bore sidewall which connect with the chamber 29, and said inlet port is connected in the vehicle brake circuit, as previously mentioned, while a bleeder screw 36b is threadedly received in said housing closing said bleeder port. It should be noted that the openings 36, 36a are generally coplanar with respect to an imaginary plane passing therethrough and substantially normal to the bore 23.

Figure 5:
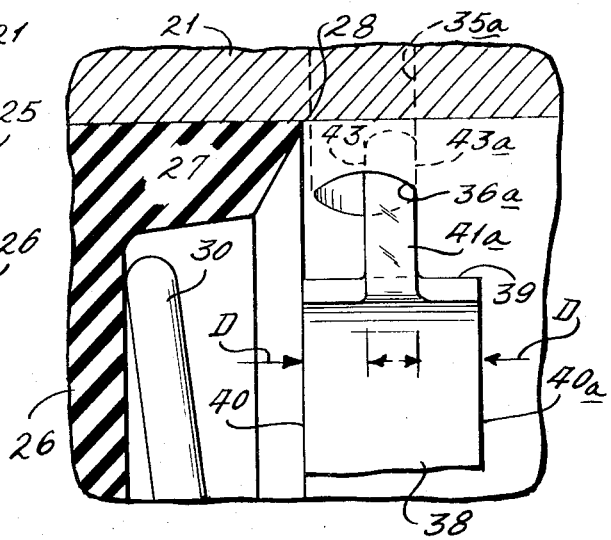
FIG. 5 is an enlarged partial sectional view taken along line 5—5 of FIG. 3.

Referring now also to FIGS. 4 and 5, a spacing or abutment member, such as the sealing means stop indicated generally at 37, is provided with a body portion 38 having a generally U-shaped or interrupted annular shaped configuration and preferrably stamped or otherwise formed from spring-type steel or other resilient material affording a radially expanding spring-like characteristic thereto, and the use of a plastic-type material is also contemplated. The circumference of the interrupted annular body 38 should be at least equal to that of the wheel cylinder bore 23, and it is preferred that the body circumference be slightly larger than that of said wheel cylinder bore wherein the spring-like characteristics of said body upon compression thereof in said bore effects frictional or gripping engagement therebetween, as discussed hereinafter. The body 38 is provided with a radially outer, peripheral or interrupted circumferential surface 39 which is received or urged into frictional engagement with the wheel cylinder bore in response to the spring-like characteristics of said body, and said surface is defined between opposed side edges or abutment surfaces 40, 40a provided on said body for respective abutting or spacing engagement with the sealing means 25, 25a. Opposed retaining means, such as reduced tangs or end portions 41, 41a are respectively integrally provided on the body 38 extending in a direction generally outwardly or radially of said body, and opposed side edges or abutment surfaces 42, 42a and 43, 43a are provided on said tangs generally parallel to the body side edges 40, 40a and predeterminately spaced therefrom a distance or length D, respectively. The predetermined spaced relation D between the body edges 40, 40a and the tang edges 42, 42a and 43, 43a, respectively, is dependent upon the size of the passage 35, 35a and openings 36, 36a. In other words, upon the insertion of the spacing member 37 into assembled position in the bore 23, the tangs 41, 41a expand radially outwardly through the openings 36, 36a into the passages 35, 35a while the body peripheral surface 39 is urged radially outwardly into frictional abutting engagement with the bore sidewall 24, and with one of the side edges 42, 42a and 43, 43a of said tangs engaged with the housing 12 within said passages adjacent to one side of said openings, one of the body side edges 40, 40a is spaced from said side edges of said tangs adjacent thereto the distance D which is great enough to axially extend said one of the body side edges 40, 40a in said bore farther than the other side of said openings.

OPERATION

In the operation of the system 1, the vacuum and brake fluid valves 3, 18 thereof are intially in closed or off positions obviating communication or flow therethrough wherein the vacuum pump 2a is operative to evacuate the vacuum reservoir 5 to atmosphere though the conduit 4 and the brake fluid pump 17 is operative to predeterminately charge the accumulator 15 which flows thereto from the brake fluid reservoir 14a through the conduit 17. In order to vacuum bleed and pressure fill the vehicle brake circuit 10 on the original equipment manufacturer's vehicle assembly or production line, the probe 7 of the system 1 is manually inserted into the master cylinder reservoir 8 into covering sealing relation about the compensating and supply port holes thereof, and the vacuum valve 3 is then selectively actuated to an open or on position connecting the vacuum producing means 2a in communication with the vehicle brake circuit. In this manner, atmosphere is evacuated from the vehicle brake circuit 10 flowing from the chamber 29 through the passage 35 of the wheel cylinders 12 into conduits 11, 13 and the master cylinder 19 of said vehicle brake circuit and therefrom through the probe 7, the conduit 6 and the vacuum producing means 2a to the atmosphere.

Of course, the vacuum created in the wheel cylinder chamber 29 and the ambient atmosphere establishes a pressure differential acting across the sealing means 25, 25a and pistons 31, 31a resulting in forces F, Fa which urge said sealing means and pistons axially inwardly into the wheel cylinder bore 23 contracting said chamber. Due to the tolerance difference between the component parts of the wheel cylinder 12 and also "stick-slip" conditions therebetween, it is contemplated that only one, instead of both sealing means 25, 25a may be moved in the bore 23 in response to the forces F, Fa acting thereon or it may be that one of said sealing means moves farther than the other thereof. However, as shown in FIGS. 2–5, the force F acting on the sealing means 25 and piston 31 moves the leading or lip edge 28 of said sealing means into abutting engagement with the abutment 40 on the spacing member 37 wherein the edges 42a, 43a of the spacing member tangs 41, 41a engage the housing 21 defining the passages 35, 35a adjacent to the leftward side of the bore openings 36, 36a respectively. As previously mentioned, the spacer member edges 40, 40a are predeterminately spaced a distance D from the tang edges 42, 42a and 43, 43a upon the respective engagements thereof with the sides of the bore openings 36, 36a; therefore, upon the movement of the sealing member edge 28 into abutting engagement with the spacer member edge 40, farther movement of the sealing member 25 in response to the force F is precluded to prevent the blocking or overlapping engagement of said sealing member 25 about the bore openings 36, 36a and to maintain communication through said openings between the chamber 29 and the vacuum producing means 2a.

When the vehicle brake circuit 10 is so evacuated or bled of the atmosphere therein, the vacuum valve 3 is selectively actuated toward its original closed or off position isolating the vacuum producing means 2a from said vehicle brake circuit, and the brake fluid valve 18 is selectively or simultaneously actuated toward an open or on position connecting the accumulator 15 in open pressure fluid communication with said vehicle brake circuit. In this manner, brake fluid flows or is injected under accumulator pressure through conduits 19, 20 6 and the brake fluid valve 18, the probe 7 and the compensating and supply port holes of the master cylinder 9 sealably covered thereby into the conduits 11, 13 of the vehicle brake circuit and the inlet port and chamber 35, 29 of the wheel cylinder 12 to completely fill with brake fluid the void created upon evacuation of the vehicle brake circuit, as previously discussed. The pressurized brake fluid so injected into the vehicle brake circuit acts on the sealing means 25, 25a of the wheel cylinder 12 urging them and the pistons 31, 31a toward their normal or at rest positions within the wheel cylinder bore 23.

From the foregoing, it is apparent that the spacing member 37 which is removably secured in the wheel cylinder bore 23 having opposed tangs 41, 41a resiliently urged into displacement preventing engagement with the wheel cylinder passages 35, 35a and openings 36, 36a is engagable with the sealing means 25, 25a to predeterminately space said sealing means from said openings and prevent the blockage thereof upon the vacuum bleeding of the vehicle brake circuit 10 by the system 1. Further, in the event the wheel cylinder 12 is repaired in the field, the spacing member 37 can be removed from the wheel cylinder bore 23 upon the disassembly thereof to permit a corrective honing operation to be performed on said wheel cylinder bore. Of course, the spacing member 37 need not be replaced in the wheel cylinder 12 upon the field repair thereof since repair shops or garages employ only the conventional pressure type bleeding process wherein the master cylinder is pressurized to purge air trapped in the vehicle brake circuit through the wheel cylinder bleeder port and screw 35a, 35b, as is well known in the art.

In FIG. 6, another spacing or abutment member, such as the sealing means stop 50, is shown having substantially the same component parts and dimensions and functioning in the system 1 and wheel cylinder 12 substantially in the same manner as the previously described spacer member 37 with the following exceptions. The spacer member 50 is provided with a body portion 51 which is substantially the same as that of the previously discussed spacer member 37 except that the body 51 is provided with a plurality of integrally formed successive land and groove portions 52, 53 therein, and the peripheral surface 39 of the body 51 is frictionally engaged with the wheel cylinder bore 23 at said land portions.

Figure 7:
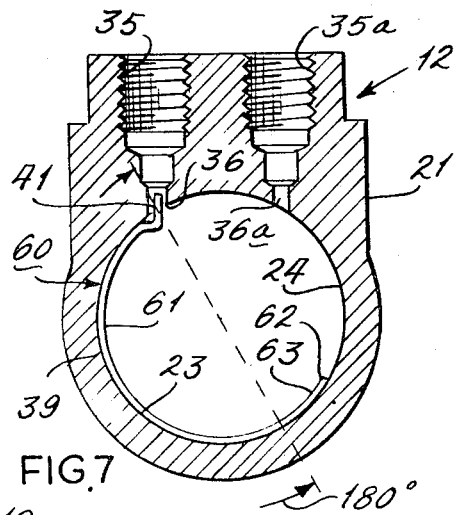

Another spacing or abutment member, such as the sealing means stop 60, is shown in FIG. 7 having substantially the same component parts and dimensions and functioning in the system 1 and wheel cylinder 12 substantially in the same manner as the previously described spacer member 37 with the following exceptions. The spacer member 60 is provided with a body 61 which is the same as that of the spacer member 37 except that the body 61 is terminated at 62 providing a terminal portion 63 which is radially displaced at least in excess of at least 180° from the engagement of the single tang 41 integrally formed with the body 61 with the housing 21 defining the passage 35 in the wheel cylinder 12. The interrupted circumferential or peripheral surface 39 of the body 61 is urged into frictional engagement with the wheel cylinder bore 23, and since the terminal portion 63 of said body is displaced in excess of 180° from the engagement of the single tang 41 with the housing passage 35, said single tang 41 can only be displaced from such engagement upon the relative compression of said single tang 41 and terminal portion 63 toward each other. While the single tang 41 is shown engaged with the housing passage 35, it is apparent that the spacer member 60 could be reversed in the wheel cylinder bore 23 so that said single tang would extend through the opening 36a into displacement preventing engagement with the housing passage 35a.

Figure 8:
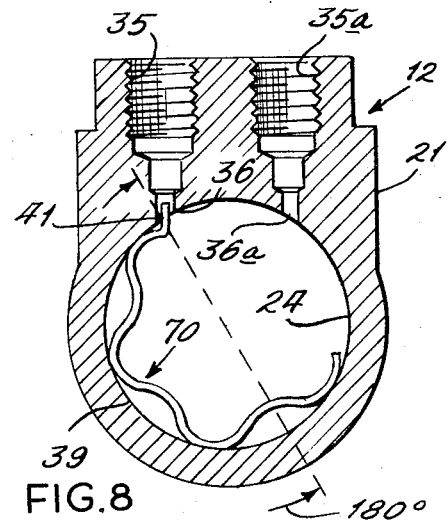

Referring to FIG. 8, another spacing member 70 is shown having substantially the same component parts and functioning in the system 1 and wheel cylinder 12 in substantially the same manner as the previously described spacing member 50 with the following exceptions. The spacing member 70 is provided with a body 71 which is the same as that of the spacer member 50 except that the body 71 is terminated at 72 providing a terminal portion 73 which is radially displaced in excess of at least 180° from the engagement of the single tang 41 integrally formed on the body 71 with the housing 21 defining the passage 35 in the wheel cylinder 12. The inherent resiliency of the body 71 urges the peripheral surface 39 at the land portions 52 thereof into frictional engagement with the wheel cylinder bore 23, and since the terminal portion 73 of said body is displaced in excess of at least 180° from the engagement between the single tang 41 and the housing passage 35, said single tang can only be displaced from such engagement upon the relative compression of said tang and terminal portion toward each other. While the single tang 41 is shown engaged with the housing passage 35, it is obvious that the spacer member 70 could be reversed in the wheel cylinder bore 23 so that said single tang would protrude through opening 36a into displacement preventing engagement with the housing passage 35a.

Figure 9:
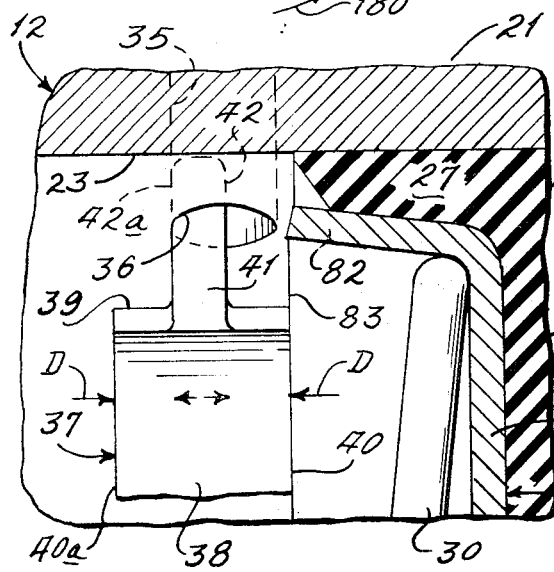
FIG. 9 is an enlarged partial sectional view taken along line 4—4 of FIG. 3 and showing a sealing cup expander engaged with the spacing member also embodied in the present invention.

In FIG. 9, the sealing means 25 is shown including a conventional expander or spreader 80 which is generally cup-shaped in configuration having a disc shaped base portion 81 integrally formed with an annular divergent sidewall or lip spreader or expander portion 82, and an annular leading or abutment edge 83 is provided on said sidewall portion, said edge being closely spaced from the wheel cylinder bore 23. The base and sidewall portions 81, 82 of the spreader 80 are urged into abutting engagement with the corresponding base and lip portions 26, 27 of the sealing means 25 by the return spring 30 wherein said spreader sidewall portion urges said sealing means lip portion into sealing engagement with the wheel cylinder bore 23 primarily to ensure such sealing engagement when said sealing means is in its normal, static or at-rest position in said wheel cylinder bore without being pressurized. During the vacuum bleeding process of the wheel cylinder 12, as previously described, the spreader leading edge 83 is engaged with the side edge 40 of the spacer member 37 upon the movement of the sealing means 25 and piston 31 in the wheel cylinder bore 23 in response to the force F acting thereon, and since the spreader edge 83 predeterminately extends beyond the sealing means edge 28 toward the openings 36, 36a, the abutting engagement between the spacer member and spreader edges 40, 83 predeterminately spaces said sealing means from said openings obviating the possibility of blocking or overlapping engagement therebetween. While the spreader 80 has been described for use with the spacer member 37 hereinabove, it is apparent that said spreader can also be utilized with the previously described spacer members 50, 60 and 70 to achieve the desired operational results as set forth hereinabove.

Figure 10:
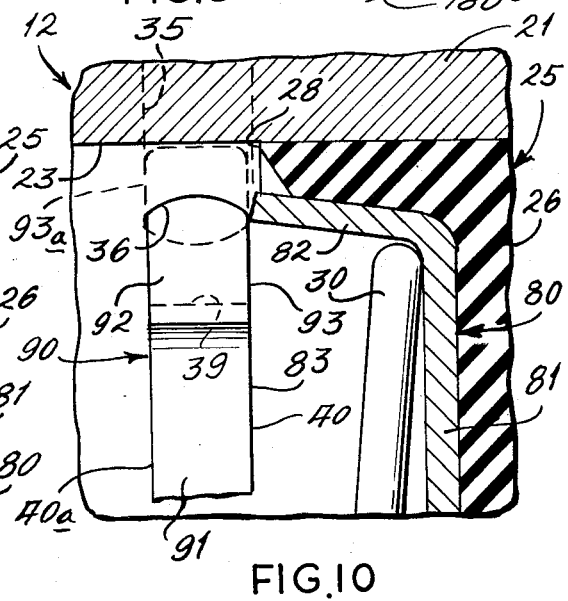
FIG. 10 is an enlarged partial sectional view taken along line 4—4 of FIG. 3 showing an alternative spacing member engaged with a sealing cup expander also embodied in the present invention.

In FIG. 10, another spacer member 90 having substantially the same component parts and functioning in the system 1 and wheel cylinder 12 substantially in the same manner as the previously described 37. The spacing member 90 is provided with a body 91 which is the same as that of the spacer 37 except that the body 91 is provided with opposed tangs 92, 92a which are substantially of the said general configuration as the tangs 41, 41a of the spacer member 37 although for the sake of simplicity only the tang 92 is shown; however, the opposed side edges 93, 93a and 94, 94a of the tangs 92, 92a are substantially co-extensive with the side edges 40, 40a of the body 91. The opposed tangs 92, 92a are insertable through the openings 36, 36a into displacement preventing engagement with the housing passages 35, 35a, respectively, and as shown in FIG. 10, the width of said tangs between the respective side edges 93, 93a and 94, 94a thereof approximates the diameter of the openings 36, 36a to predeterminately limit axial displacement movement of the spacer member 90 in the wheel cylinder bore 23. During the vacuum bleeding process of the wheel cylinder 12, as previously described, the spreader leading edge 83 is engaged with the side edge 40 of the spacer member 90 upon the movement of the sealing means 25 and piston 31 in the wheel cylinder bore 23 in response to the force F acting thereon, and since the spreader edge 83 predeterminately extends beyond the sealing means lip edge 28 toward the openings 36, 36a, the abutting engagement between the spacer member and spreader edges 40, 83 predeterminately spaces said sealing means from said openings obviating the possibility of blocking or overlapping engagement therebetween in order to insure communication between the wheel cylinder chamber 29 and passage 29, 35. In other words, with the edges 93a, 94a respectively engaged with the housing 21 defining the passages 35, 35a adjacent to one side of the openings 36, 36a, the engagement of the spreader leading edge 83 with the side edge 40 of the body 91 and the portions of the opposed side edges 93, 94 of the tangs 92, 92a which are positioned or extend within the wheel cylinder bore 23 predeterminately spaces the sealing means lip edge 28 from the sides of the openings 36, 36a adjacent thereto.

Figure 11:
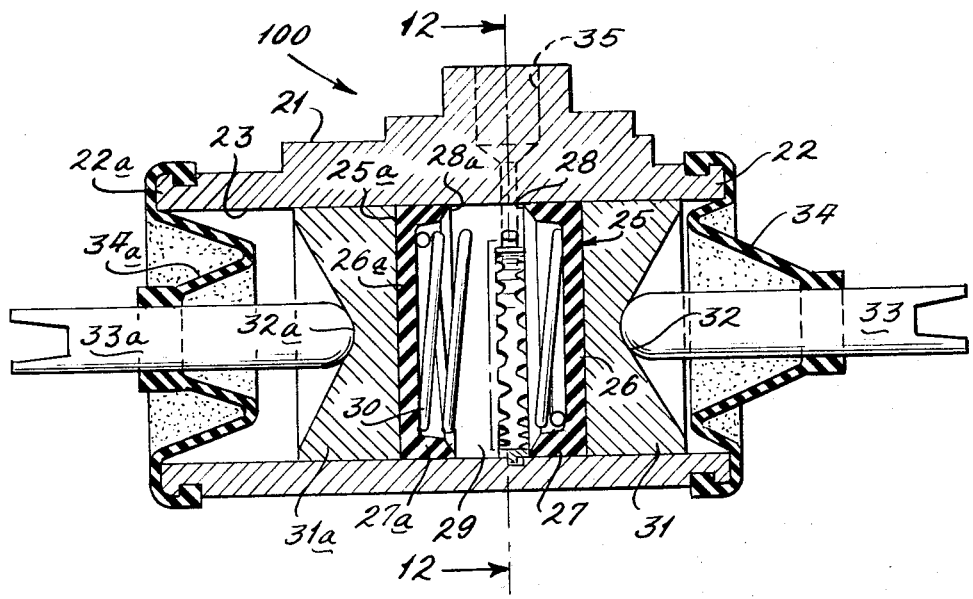

Referring now to FIG. 11, another wheel cylinder 100 is provided with substantially the same component parts and functioning in the system 1 and brake circuit 10 in substantially the same manner as the previously described wheel cylinder 12 with the following exceptions. The wheel cylinder 100 is provided with an annular groove 101 in the bore 23 in a plane substantially normal thereto and connecting with the passage 35, 35a so as to eliminate the openings 36, 36a in the bore 23 of the previously described wheel cylinder 12.

Figure 12:
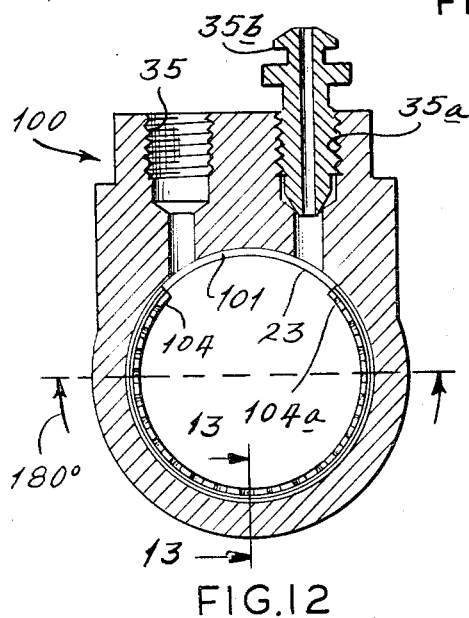
FIG. 12 is an enlarged partial sectional view taken along line 12—12 of FIG. 11.
Figure 13:
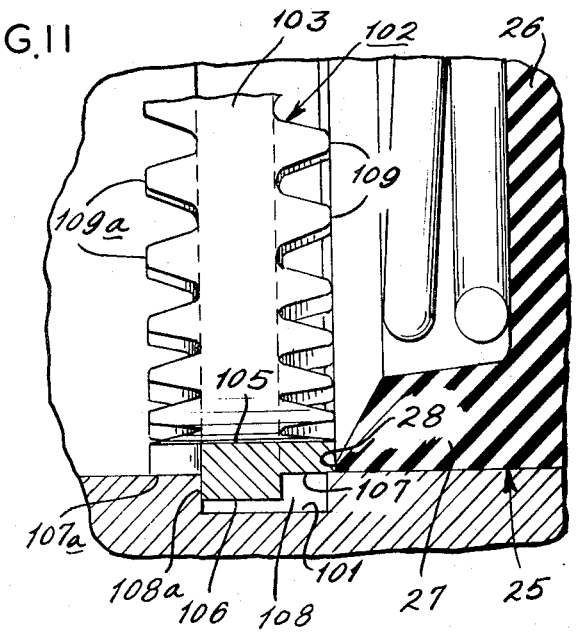
FIG. 13 is an enlarged fragmentary partial sectional view taken from FIG. 11.

Another spacing or abutment member, such as the sealing means stop 102 shown also in FIGS. 12 and 13, is provided with a body portion 103 including opposed end portions 104, 104a and having a generally U-shaped or interrupted annular shaped configuration and preferrably formed from spring-type steel or other resilient material affording a radially expanding or contracting spring-like characteristic thereto, and the use of a plastic-type material is also contemplated. The body 103 is provided with a substantially T-shaped cross-section having a table or horizontally or axially extending portion 105 integrally formed with a web or vertically or radially extending portion 106, and radially outer, peripheral or interrupted circumferential surfaces 107, 107a which are received or urged toward frictional engagement with the wheel cylinder bore 23 in response to the spring-like characteristics of said body are respectively provided on said table portion adjacent to and on opposite sides of said web portion. The periphery or circumference of the interrupted surfaces 107, 107a is preferred to be at least equal to that of the wheel cylinder bore 23, but it is contemplated that said periphery or circumference could also be slightly less than that of said wheel cylinder bore since the web 106 extends into displacement preventing engagement with the wheel cylinder bore groove 101. In other words, due to the displacement preventing engagement of the web 106 with the wheel cylinder bore groove 101, the sizing or dimensioning of the periphery of the surfaces 107, 107a is not critical, i.e. it can be at least equal to and perhaps less than the circumference of the wheel cylinder bore 23; however, it is preferred that the opposed end portions 104, 104a of the body 103 extend radially at least in excess of 180° of the wheel cylinder bore circumference in order to prevent vertical or radial displacement of said body from said wheel cylinder bore groove. And it should be noted that the peripheral base of the web portion 106 is predeterminately radially spaced from its corresponding base wall of the groove 101. The body web 106 is provided with opposed side edges or abutments 108, 108a for respective abutting displacement with the opposed sidewalls of the wheel cylinder bore groove 101 to predeterminately limit the axial movement of the spacing member 102 in the wheel cylinder bore 23, and the body table 105 is provided with a plurality of opposed side edges or interrupted abutments 109, 109a for abutting engagement with the leading edges 28, 28a of the sealing means 25, 25a, respectively. To complete the description of the spacer member 102, a plurality of opposed recess or scalloped portions 110, 110a are respectively provided in the table 107, 107a between the interrupted abutments 109, 109a to insure communication between the passages 35, 35a and the chamber 29 through the groove 101 regardless of the axial or radial position with respect thereto of said spacer member.

During the vacuum bleeding process of the wheel cylinder 100 which is the same as that previously discussed herein with respect to the wheel cylinder 12, the leading edge 28 of the sealing means 25 is engaged with the side edge or abutments 109 of the spacer member body 103 upon the movement of the sealing means 25 and piston 31 axially inwardly in the wheel cylinder bore 23 in response to the force F acting thereon. If the force F is great enough to overcome the force of frictional engagement between the body peripheral surfaces 107, 107a and the wheel cylinder bore 23, then the spacer member 37 is concertedly movable leftwardly in said wheel cylinder bore until the web side edge 108a is abuttingly engaged with its corresponding or opposed sidewall of the groove 101, and in this manner, the axial movement of said spacer member is predeterminately limited. With the web sidewall 108a engaged so engaged with the corresponding sidewall of the groove 101, the abutments 109 of the body table 105 predeterminately spaces the sealing means 25 from the groove 101 to obviate the possibility of blocking engagement therebetween. In this manner, the chamber 29 is maintained in communication with the passages 35, 35a through the groove 101 and the spacer member recess 110. It is apparent that the spacer member 102 is effective to maintain communication between the chamber 29 and passages 35, 35a irrespective of its assembled position in the groove 101 and irrespective of which sealing means 25, 25a engages the spacer member 102 upon vacuum bleeding of the brake circuit 10 and wheel cylinder 100. Furthermore, it is also apparent that if the sealing means 25, 25a include spreaders 80, as previously discussed herein, said spreaders will contact the body abutments 109, 109a of the spacer member 102 in order to predeterminately space said sealing members from blocking engagement with the groove 101.

From the foregoing, it is now apparent that a novel system 1 and wheel cylinders 12, 100 are described hereinbefore, and changes or modifications as to the precise connections, configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A wheel cylinder adapted for vacuum bleeding comprising a housing having opposed end portions, an axial bore in said housing having a cylindrical sidewall intersecting with said end portions, a pair of ports in said housing intersecting with said bore and defining a pair of spaced openings in said sidewall between said end portions substantially in the same plane normal to said bore, a pair of opposed force transmitting piston means respectively movable in said bore adjacent to the opposed end portions, a pair of sealing means sealably interposed between said sidewall and piston means and movable in said bore between said piston means and openings, respectively, an expansible chamber in said bore between said sealing means and communicating with said openings, said chamber being selectively subjected to vacuum bleeding through one of said ports, spring means in said chamber and having opposed ends connected in biasing engagement with said sealing means, a resilient spacer member in said chamber including a generally annular body portion extending about at least a major portion thereof between said openings, a peripheral surface on said body at least a portion of which is radially urged toward engagement with said sidewall in response to the inherent force of said resilient spacer member, a pair of opposed abutments on said body portion respectively contiguous with said peripheral surface and substantially normal thereto, a pair of opposed tangs on said body portion extending through said openings into said ports for engagement with said housing defining said ports to predeterminately limit movement of said spacer member in said bore both axially and circumferentially thereof, respectively, said tangs being displaced from said body portion in a direction generally radially outwardly of said bore, a pair of opposed side edges on each of said tangs for engagement with said housing defining said ports to limit the movement of said spacer member in said bore axially thereof, at least one of said sealing means and one of said piston means being movable against said spring means in response to a differential force established thereacross between the vacuum in said chamber and the ambient atmosphere acting thereon toward positions in said bore engaging said one sealing means with one of said abutments to displace said spacer member axially in said bore and engage one of said side edges of said tangs with said housing adjacent to one side of said ports upon the selective subjection of said chamber to vacuum bleeding, respectively, and said one abutment being predeterminately axially spaced from said one side edge of said tangs a distance great enough to prevent engagement of said one sealing means with said openings adjacent to the other side of said ports when said one sealing means is engaged with said one abutment and said one side edge of said tangs is engaged with the housing adjacent to one side of said ports.

2. A wheel cylinder adapted for vacuum bleeding comprising a housing having opposed ends, an axial bore in said housing intersecting with the opposed ends thereof, annular groove means in said bore between said opposed ends including a pair of axially spaced side walls having an annular base wall interposed therebetween, a pair of ports in said housing intersecting with said base wall, a pair of opposed force transmitting piston means movable in said bore between said housing ends and said groove means, respectively, a pair of sealing means sealably interposed between said bore and piston means and movable in said bore between said piston means and groove means, respectively, an expansible chamber in said bore between said sealing means and communicating with said groove means, said chamber being selectively subjected to vacuum bleeding through one of said ports, spring means in said chamber and having opposed ends respectively connected in biasing engagement with said sealing means urging said sealing means toward engagement with said piston means, a resilient spacer member in said chamber including a body portion having a generally arcuate configuration and engaged with said bore at least about a major portion of the circumference thereof, a pair of opposed circumferentially spaced and axially extending end portions on said body portion, said body portion including flange means between said end portions and extending radially outwardly of said bore into said groove means, axially spaced apart opposed side edges on said flange means for respective engagement with said groove means sidewalls to limit movement of said spacer member in said bore axially thereof, sleeve means on said body portion between said and portions integral with said flange means including a pair of opposed surfaces engaged with said bore adjacent to said groove means sidewalls, opposed abutment surfaces on said sleeve means between said sealing means and said groove sidewalls and extending generally radially of said bore for engagement with said sealing means, respectively, at least one of said sealing means and piston means being movable against said spring means in response to a differential force established thereacross between vacuum in said chamber when selectively subjected thereto and the ambient atmosphere acting thereon toward positions in said bore engaging said one sealing means with one of said opposed abutments to displace said spacer member axially in said bore and engage one of said flange means side edges with one of said groove means sidewalls, said one opposed abutment being predeterminately axially spaced from said one groove means side edge a distance great enough to maintain said sealing means predeterminately spaced from the other of said groove means sidewalls upon the engagement of said one abutment and one sealing means and the engagement of said one flange means side edge and one groove means sidewall, and a plurality of passages in said sleeve means maintaining said chamber in open communication with said one port through said groove means.

3. In a vacuum bleeding and brake fluid filling system for vehicle hydraulic brake circuit, vacuum creating means sealectively connected with said circuit and operable generally to create a vacuum therein, brake fluid filling means selectively connected with said circuit and operable generally to inject brake fluid into said circuit to fill the void created therein when said circuit is subjected to vacuum, at least one vehicle brake having a wheel cylinder thereon for connection in said circuit, said wheel cylinder including a housing with a bore therein, at least one sealing member reciprocally movable in said bore and defining therewith an expansible chamber for subjection to the vacuum and brake fluid, at least one passage means in said housing connected in open communication with said circuit and intersecting with said bore to define therein an opening connecting with said chamber, a resilient spacer member removably secured within said chamber adjacent said opening and extending at least about a major portion of the circumference of said bore, a peripheral surface on said spacer member and the resiliency of said spacer member urging at least a portion of said peripheral surface into engagement with said bore, tang means on said spacer member extending through said opening into said passage means for displacement limiting engagement with the side portions of said passage means defined by said housing to predeterminately limit movement of said spacer member in said bore both axially and circumferentially thereof, and abutment means on said spacer member for engagement with said sealing member to predeterminately space said sealing member from said opening and maintain communication therethrough between said chamber and one passage means upon the movement of said sealing member toward engagement with said abutment means in response to the created vacuum acting on said sealing member in said chamber.

4. A system according to claim 3, wherein said spacer member has a generally arucate configuration with a radius at 'east as great as that of said bore.

5. A system according to claim 4, comprising a plurality of land means and groove means in said spacer member, said peripheral surface being urged into engagement with said bore generally at said land means.

6. A system according to claim 4, comprising a free end portion on said spacer member and spaced from the engagement of said tang means with said one passage means at least in excess of a major portion of the circumference of said bore.

7. A wheel cylinder adapted for vacuum bleeding comprising a housing, a bore in said housing, groove means in said bore substantially normal thereto, at least one fluid pressure passage means in said housing and intersecting with said groove means, and at least one sealing means movable in said bore; the combination therewith comprising other means removably secured in said groove means including means having flange means extending radially outwardly of said bore into said groove means and sleeve means engaged with said bore adjacent to each side of said groove means and extending from said groove means toward said one sealing means for abutting engagement therewith to predeterminately space said one sealing means from said groove means, said one sealing means being movable in said bore toward abutment with said included means upon the vacuum bleeding of said wheel cylinder, and a plurality of recess means in said included means for communication therethrough between said bore and groove means.

8. A wheel cylinder according to claim 7, wherein said other means comprises a resilient body having a generally arcuate configuration with a radius in excess of that of said bore, and opposed ends on said body, said body being engaged with said bore at least about a major portion of the circumference thereof.

9. A wheel cylinder according to claim 7, comprising a plurality of abutment means on said sleeve means and extending generally radial'y inwardly of said bore between said recess means.

10. A wheel cylinder according to claim 7, wherein said other means comprises a resilient body having a generally arcuate configuration and engaged with said bore at least about a major portion of the circumference thereof including opposed end portions extending axially of said bore, and flange means between said end portions and extending radially outwardly of said bore into said groove means, said included means including sleeve means in said body between said end portions integral with said flange means and engaged with said bore adjacent to each side of said groove means, said recess means being in said sleeve means, and abutment means in said sleeve means extending generally radially inwardly of said bore between said recess means.

11. A wheel cylinder according to claim 7, wherein said groove means includes axially spaced apart sidewalls having an annular base wall interposed therebetween, said one passage means intersecting with said base wall, opposed side portions on said flange means for respective engagement with said sidewalls to limit movement of said other means in said bore axially thereof, said abutment means on said sleeve means extending between one of said sidewalls and said one sealing means when one of said side portions is engaged with the other of said sidewalls.

12. A wheel cylinder according to claim 11, wherein said flange means is predeterminately spaced radially inwardly of said base wall to maintain communication through said groove means between said one passage means and bore.

13. In a wheel cylinder adapted for vacuum bleeding including a housing, a bore in said housing, at least one fluid pressure passage means in said housing intersecting with said bore and defining an opening therein, at least one sealing member reciprocally movable in said bore, a resilient spacer member removably secured within said bore adjacent said opening and having a body portion extending at least about a major portion of the circumference of said bore, a peripheral surface on said body portion and the resiliency of said spacer member urging at least a portion of said peripheral surface toward engagement with only said bore, tang means on said body portion extending through said opening into said passage means for displacement limiting engagement with the side potions of said passage means defined by said housing to predeterminately limit movement of said spacer member in said bore both axially and circumferentially thereof, and abutment means on said body portion adjacent said bore for engagement with said sealing member, said abutment means being predeterminately axially spaced from said tang means to prevent blockage of said opening by said sealing member upon the movement thereof toward abutting engagement with said abutment means in response to the vacuum bleeding of said wheel cylinder.

14. A wheel cylinder according to claim 13, wherein said sealing member comprises a sealing cup slidable in said bore and having an annular sealing lip for sealing engagement therwith, expander means engaged with at least said sealing lip urging it toward sealing engagement with said bore, and a substantially annular edge portion on said expander means extending between said sealing lip and said abutment means, said expander means and sealing cup being concertedly movable in said bore to engage said edge portion with said abutment means spacing said sealing edge from said opening upon the movement of said sealing means in response to vacuum bleeding of said wheel cylinder.

15. A wheel cylinder according to claim 13, comprising other abutment means on said tang means within said passage means for engagement with said housing, said abutment means being urged toward engagement with said housing within said passage means and adjacent to one side of said opening to limit movement of said spacer member in said bore axially thereof upon the movement of said sealing member into engagement with said first named abutment means.

16. A wheel cylinder according to claim 15, comprising a predetermined axial distance between said first named and other abutment means great enough to maintain communication between said one passage means and bore through said opening when said other abutment means is urged into engagement with said housing upon the movement of said sealing member into engagement with said first named abutment surface.

17. A wheel cylinder according to claim 13, comprising other passage means in said housing intersecting with said bore and defining another opening therein substantially in a plane normal to said bore and intersecting with said first named opening, another sealing member reciprocally movable in said bore and opposed to said first named sealing member, said first named and other sealing member defining with said bore an expansible chamber therein connected with said first named and other openings, and resilient means in said chamber and engaged between said first named and other sealing members, said spacer member being within said chamber and said first named and other sealing members being movable toward said spacer member to contract said chamber in response to the vacuum bleeding of said wheel cylinder.

18. A wheel cylinder according to claim 17, comprising a plurality of land means and groove means in said body portion and extending generally raidally of said bore, said peripheral surface being engaged with said bore substantially at said land means.

19. A wheel cylinder according to claim 17, comprising other abutment means on said body portion opposite to said first named abutment means for engagement with said other sealing member upon the movement thereof in response to the vacuum bleeding of said wheel cylinder, and other tang means on said body portion extending through said other opening into said other passage means and into displacement limiting engagement with other side portions of said other passage means defined by said housing to also predeterminately limit movement of said spacer member in said bore both axially and circumferentially thereof said other abutment means being predeterminately spaced from said other tang means to prevent blockage of said other opening upon the engagement of said other sealing member with said other abutment means.

20. A wheel cylinder according to claim 19, comprising another pair of opposed side edges on said other tang means for axial displacement limiting engagement with the other side portions of said other passage means, one of said side edges of each of said first named and other tang means being urged toward engagement with the side portions of said first named and other passage means upon the engagement of one of said first named and other sealing members with one of said first named and other abutment means, and the predetermined spaced relation between said side edges and said abutment means being great enough to prevent the blocking engagement of one of said first named and other sealing members with said openings.

21. A wheel cylinder according to claim 20, wherein said first named and other sealing members comprise a pair of expander means within said chamber, said expander means being connected with said resilient means, and a pair of leading edges on said expander means for respective engagement with said first named and other abutment means, at least one of said leading edges being engaged with at least one of said first named and other abutment means upon the movement of at least one of said first named and other sealing members in response to the vacuum bleeding of said wheel cylinder.

22. A wheel cylinder according to claim 21, wherein said body portion is substantially the same radial contour as said bore about at least the major portion thereof, said peripheral surface being urged toward engagement with said bore throughout the major portion thereof, and said first named and other tang means extending in a direction generally outwardly of said body portion.

23. A wheel cylinder according to claim 13, comprising a pair of opposed side edges on said tang means for axial displacement limiting engagement with side portions of said passage means, at least one of said side edges being predeterminately spaced from said abutment means wherein said abutment means extends axially beyond said opening the engagement of said one side edge with said first named housing portion.

24. A wheel cylinder according to claim 23, comprising a plurality of successive land means and groove means in said body portion, said peripheral surface being urged toward engagement with said bore at said land means.

25. A wheel cylinder according to claim 23, comprising a free end portion on said body portion opposed to said tang means, said free end portion being spaced from said tang means at least in excess of a major portion of the circumference of said bore.

26. A wheel cylinder according to claim 23, wherein said body portion has a contour substantially the same as said bore and a radius in excess of that of said bore when said spacer member is removed from said bore.

27. A wheel cylinder according to claim 23, wherein said body portion has a generally arcuate configuration and said peripheral surface has a radius in excess of that of said bore when said spacer member is in its free state, said tang means extending in a direction generally outwardly of said bore, and a free end portion on said body portion and spaced from said tang means at least in excess of a major portion of the circumference of said bore.

* * * * *

UNITED STATES PATENT OFFICE
CERTIFICATE OF CORRECTION

Patent No. 3,765,518                Dated October 16, 1973

Inventor(s) Michael E. Martin

It is certified that error appears in the above-identified patent and that said Letters Patent are hereby corrected as shown below:

Column 6, line 6, "19" should read -- 9 --; line 29, after "36a" insert a comma -- , --. Column 11, line 52, "extablished" should read -- established --. Column 13, line 32, "'east" should read -- least --. Column 14, line 3, "radial'y" should read -- radially --.

Signed and sealed this 18th day of June 1974.

(SEAL)
Attest:

EDWARD M. FLETCHER, JR.                C. MARSHALL DANN
Attesting Officer                      Commissioner of Patent